United States Patent [19]

Tu

[11] 4,305,845

[45] Dec. 15, 1981

[54] ZEOLITIC CATALYST

[75] Inventor: Hosheng Tu, Irvine, Calif.

[73] Assignee: UOP Inc., Des Plaines, Ill.

[21] Appl. No.: 195,909

[22] Filed: Oct. 10, 1980

[51] Int. Cl.[3] ............................................. B01J 29/08
[52] U.S. Cl. ................................. 252/455 Z; 208/120
[58] Field of Search .................................... 252/455 Z

[56] References Cited

U.S. PATENT DOCUMENTS

| | | | |
|---|---|---|---|
| 3,054,657 | 9/1962 | Breck | 23/113 |
| 3,056,654 | 10/1962 | Barrer et al. | 23/113 |
| 3,130,007 | 4/1964 | Breck et al. | 23/113 |
| 3,140,252 | 7/1964 | Frilette et al. | 208/120 |
| 3,264,208 | 8/1966 | Plank et al. | 252/455 Z |
| 3,375,206 | 3/1968 | Shaw | 252/455 Z |
| 3,472,617 | 10/1969 | McDaniel et al. | 23/112 |
| 3,501,418 | 3/1970 | Magee, Jr. et al. | 252/450 |
| 3,657,154 | 4/1972 | Haden et al. | 252/455 Z |
| 3,867,310 | 2/1975 | Elliott, Jr. et al. | 252/455 Z |
| 4,113,843 | 9/1978 | Mirsky et al. | 423/329 |
| 4,142,995 | 3/1979 | Alafandi et al. | 252/455 Z |
| 4,215,015 | 7/1980 | Tu | 252/453 |
| 4,256,609 | 3/1981 | Dale | 252/455 Z |

*Primary Examiner*—Carl F. Dees
*Attorney, Agent, or Firm*—James R. Hoatson, Jr.; Gregory J. Mancuso; William H. Page, II

[57] ABSTRACT

A low temperature method of calcining a zeolitic catalyst and the product of the method, the method comprising reducing the water content of the catalyst to less than 1.5 wt. % by contacting the catalyst with a water-miscible organic fluid and thereafter calcining the catalyst at a temperature of less than about 1200° F.

10 Claims, No Drawings

ZEOLITIC CATALYST

BACKGROUND OF THE INVENTION

1. Field of the Invention

The fields of art to which the claimed invention pertains are catalytic composites and methods of manufacturing catalytic composites. More specifically, the claimed invention relates to the method of manufacture of a zeolitic catalytic composite, and a method of calcining zeolitic catalysts at relatively low temperatures.

2. Description of the Prior Art

Crystalline aluminosilicates, or zeolites, are well-known in the art and have found extensive application as hydrocarbon conversion catalysts or as a component thereof. Such materials are of ordered crystalline structure often visualized as a three-dimensional network of fundamental structural units consisting of silicon-centered $SiO_4$ tetrahedra and aluminum-centered $AlO_4$ tetrahedra, the tetrahedra being interconnected by a mutual sharing of apical oxygen atoms and arranged to form cages or cavities in open communication through smaller intracrystalline channels of pore openings whose narrowest cross section has essentially a uniform diameter characteristic of each crystalline aluminosilicate variety. To effect a chemical balance, each $AlO_4$ tetrahedra has a cation associated therewith—usually a sodium or other exchangeable cation. The aforementioned cages or cavities are occupied by water molecules and by the cations associated with the tetrahedra, both of which exhibit considerable freedom of movement permitting ion-exchange and reversible dehydration.

Zeolites are typically used as catalysts alone or composited with other materials. The other materials may serve as catalytic agents or, more commonly, as relatively inert supports for the zeolites. Amorphous silica-alumina is frequently composited with zeolite to form hydrocarbon conversion catalysts.

Most uses of zeolitic catalysts in hydrocarbon conversion reactions require that prior to use the catalyst be calcined at a relatively high temperature to activate and partially dehydrate the catalyst. Temperatures in the range of from about 1500° F. to about 1700° F. are commonly used. However, high temperature calcination of zeolitic catalysts reduces the physical integrity of the catalyst, producing a lower yield of finished catalyst. In addition, and at least as important, the susceptibility of the calcined catalyst to attrition during use is increased by high temperature calcination. The latter consideration is particularly important in marine bed applications, such as fluid catalytic cracking processes, in which catalyst life is a function of the catalyst's resistance to attrition.

Heretofore, the competing considerations of catalyst activity and structural integrity had to be carefully balanced during the manufacture of the catalyst. In addition, even high temperature calcination has yielded zeolitic catalysts of lower activity and selectivity than desired.

SUMMARY OF THE INVENTION

Accordingly, it is a broad objective of my invention to obtain a novel zeolitic catalyst with a superior activity and selectivity when used in hydrocarbon conversion reactions. Another objective of my invention is to provide a process for calcining a zeolitic catalyst at low temperatures to produce a zeolitic catalyst of superior activity and selectivity.

In brief summary, my invention is, in one embodiment, a low temperature method of calcining a zeolitic catalyst having a water content greater than about 1.5 wt.%, which comprises reducing the water content of the catalyst to less than about 1.5 wt.% by contacting the catalyst with a water-miscible organic fluid, and thereafter, calcining the catalyst at a temperature of less than about 1200° F.

In another embodiment, my invention is a zeolitic catalyst having a water content of less than about 1.5 wt.% prepared by contacting a zeolitic catalyst having a water content of greater than about 1.5 wt.% with a water-miscible organic fluid, and thereafter calcining the zeolitic catalyst at a temperature of less than about 1200° F.

A third embodiment of my invention is a process for cracking a hydrocarbon charge stock which comprises contacting the charge stock at cracking conditions with the catalyst of the preceding paragraph.

Other objects and embodiments are disclosed in the following description.

DESCRIPTION OF THE INVENTION

Hydrocarbon conversion catalysts containing zeolites have been available for many years. Heretofore, two basic methods of preparing zeolite containing catalysts have been known. One method involves the mixing of a zeolite, either natural or synthetic, with a matrix such as amorphous silica-alumina hydrogel or clay (U.S. Pat. No. 3,867,310, U.S. Pat. No. 3,501,418). The other method involves preforming particles of a precursor of the desired crystalline structure, and thereafter crystallizing the preformed particles (U.S. Pat. No. 3,472,617, U.S. Pat. No. 3,657,154). In both methods, it has been necessary to calcine the resulting catalysts at high temperatures, usually in excess of about 1300° F., to satisfactorily activate the catalysts prior to use.

The method and catalyst of this invention require no such high temperature conditions. Suitably active zeolite catalysts can be prepared by either of the two basic methods noted above, but with calcination at temperatures less than about 1200° F., by the method of this invention.

The zeolitic catalyst of this invention is prepared by a method which comprises (a) preparing a zeolitic catalyst having a water content greater than about 1.5 wt.%, (b) contacting said zeolitic catalyst with a water-miscible organic fluid to reduce the water content of the catalyst to less than about 1.5 wt.%, and (c) calcining the zeolitic catalyst at a temperature of less than about 1200° F.

Zeolites contemplated by this invention comprise both naturally occurring and synthetic zeolites, and encompass all zeolites capable of acting as a catalyst.

Zeolites have a three-dimensional interconnecting network structure of silica and alumina tetrahedra. The tetrahedra are formed by four oxygen atoms surrounding silicon or aluminum atoms. Each oxygen atom has two negative charges, each silicon has four positive charges. This structure permits an ordered sharing arrangement, building tetrahedra uniformly in four directions.

In hydrated form, zeolites generally are represented by the formula:

$$M_{2/n}O:Al_2O_3:wSiO_2:yH_2O$$

where "M" is a cation which balances the electrovalence of the aluminum-centered tetrahedra and which is generally referred to as an exchangeable cationic site, "n" represents the valence of the cation M, "w" represents the moles of $SiO_2$, and "y" represents the moles of water. The generalized cation "M" may be monovalent, divalent or trivalent or mixtures thereof.

In the most common commercial zeolite, Type A, the tetrahedra are grouped to form a truncated octahedron with a silica or alumina tetrahedron at each point.

In hydrated form, the Type A zeolite may be represented by the empirical formula:

$$1\pm0.2:M_{2/n}O:Al_2O_3:1.85\pm0.55:SiO_2:yH_2O$$

Another form of zeolite commonly used commercially is Type X. The type X zeolite in the hydrated or partially hydrated form can be represented as shown below:

$$(0.9\pm0.2)M_{2/n}O:Al_2O_3:(2.5\pm0.5)SiO_2:yH_2O$$

where "M" represents at least one cation having a valence of not more than 3, "n" represents the valence of "M", and "y" is a value up to about 9 depending upon the identity of "M" and the degree of hydration of the crystal. As noted the formula immediately above, the $SiO_2/Al_2O_3$ mole ratio of Type X zeolite is $2.5\pm0.5$. The cation "M" may be one or more of a number of cations such as a hydrogen cation, an alkali metal cation, or an alkaline earth cation, or other selected cations, and is generally referred to as an exchangeable cationic site. As the Type X form is initially prepared, the cation "M" is usually predominately sodium, that is, the major cation at the exchangeable cationic sites is sodium, and the zeolite is therefore referred to as a sodium-X form.

A third type of zeolite of wide commercial importance is the Type Y zeolite. The Type Y zeolite in the hydrated or partially hydrated form can be represented in terms of mole oxides as in the formula below:

$$(0.9\pm0.2)M_{2/n}O:Al_2O_3:wSiO_2:yH_2O$$

where "M" is at least one cation having a valence not more than 3, "n" represents the valence of "M", "w" is a value greater than about 3 up to about 6, and "y" is a value up to about 9 depending upon the identity of "M" and the degree of hydration of the crystal. The $SiO_2/Al_2O_3$ mole ratio for Type Y crystalline aluminosilicates can thus be from about 3 to about 6. Like the Type X form, the cation "M" may be one or more of a variety of cations but, as the Y form is initially prepared, the cation "M" is also usually predominately sodium. A Type Y zeolite containing predominately sodium cations at the exchangeable cationic sites is therefore referred to as a sodium-Y form.

Essentially, any zeolite (crystalline aluminosilicate) can be used in this invention. Illustrative are Zeolite X, U.S. Pat. No. 2,882,244, Zeolite Y, U.S. Pat. No. 3,130,007, Zeolite A, U.S. Pat. No. 2,882,243, Zeolite L, Bel. Pat. No. 575,117, Zeolite D, Can. Pat. No. 611,981, Zeolite R, U.S. Pat. No. 3,030,181, Zeolite S, U.S. Pat. No. 3,054,657, Zeolite T, U.S. Pat. No. 2,950,952, Zeolite Z, Can. Pat. No. 614,995, Zeolite E, Can. Pat. No. 636,931, Zeolite F, U.S. Pat. No. 2,996,358, Zeolite O, U.S. Pat. No. 3,140,252, Zeolite B, U.S. Pat. No. 3,008,803, Zeolite Q, U.S. Pat. No. 2,991,151, Zeolite M, U.S. Pat. No. 2,995,423, Zeolite H, U.S. Pat. No. 3,010,789, Zeolite J, U.S. Pat. No. 3,011,869, Zeolite W, U.S. Pat. No. 3,012,853, Zeolite KG, U.S. Pat. No. 3,056,654, and Omega, Can. Pat. No. 817,915. Illustrative of other suitable zeolites are levynite, dachiardite, erionite, faujasite, analcite, paulingiet, noselite, ferrierite, haulandite, scolecite, stilbite, clinoptilolite, harmotone, phillipsite, brewsterite, flakite, datolite, gmelinite, cancrinite, leucite, lazurite, mesolite, ptilolite, nepheline, natrolite, sodalite, mordenite, chabazite, and the like. Zeolites presently preferred due to their chemical, physical and catalytic properties are the large pore types in which a predominance of the pore volume is constituted by pores having diameters in excess of about 4 angstroms, usually between about 4 and about 16 angstroms. Among these, the most preferred are the ones having structures similar to faujasite, such as faujasite X and Y, and zeolites A, L, T, Omega and the like.

The zeolitic catalyst contemplated by this invention comprises either a zeolite or a zeolite dispersed in a porous inorganic oxide. In the former case, the zeolitic catalyst can comprise a single zeolite or several zeolites combined or admixed into a composite. In the latter case, the zeolite is dispersed in or on a porous inorganic oxide carrier material which is refractory at the particular hydrocarbon conversion conditions at which it is to be employed. Commonly used inorganic oxide carrier materials include (1) activated carbon, coke, charcoal; (2) silica or silica gel, silicon carbide, clays, and silicates including those synthetically prepared and naturally occurring, which may or may not be acid treated, for example, attapulgus clay, china clay, diatomaceous earth, fuller's earth, kaolin, kieselguhr, etc.; (3) ceramics, porcelain, crushed firebrick, bauxide; (4) refractory inorganic oxides such as alumina, titanium dioxide, zirconium dioxide, chromium oxide, zinc oxide, magnesia, thoria, boria, silica-alumina, silica-magnesia, chromia-alumina, alumina-boria, silica-zirconia, etc; (5) spinels such as $MgAl_2O_4$, $FeAl_2O_4$, $ZnAl_2O_4$, $MnAl_2O_4$, $CaAl_2O_4$ and other like compounds having the formula $MOAl_2O_3$ where M is a metal having a valence of 2; and (6) combinations of elements from one or more of these groups.

The size and shape of the zeolitic catalyst is not critical to this invention. The catalyst can be in any convenient or conventional shape, such as spheres, pills, cakes, extrudates, spray-dried particulates, powders, and granules.

The zeolitic catalyst having a water content of greater than about 1.5 wt.%, from which the zeolitic catalyst of this invention is prepared, can be prepared in any conventional manner. For example, a common method of preparation of zeolitic catalysts useful in fluid catalytic cracking processes is summarized as follows: (a) dispersing a zeolitic crystalline alumino-silicate in water to prepare a slurry; (b) preparing a gelation product by mixing together in an aqueous medium an inorganic aluminum salt and an alkali-metal silicate; (c) adding the slurry to the gelation product to obtain a slurry gel; and (d) spray drying the slurry gel. See U.S. Pat. No. 4,215,015. Another well-known method of preparing zeolitic catalysts comprises spray drying a slurry of a zeolite, hydrated alumina, and clay. See U.S. Pat. No. 4,142,995. A third method of preparing a zeolitic catalyst involves the oil dropping procedure, and generally comprises mixing a solution of alkali metal silicate with a solution of alkali metal aluminate to form a sol, introducing the sol into a liquid immiscible with the sol to form spherical droplets, treating the sol droplets with a basic medium to produce spheroidal silica-alumina gel particles, and crystallizing the silica-alumina particles to obtain spheroid zeolitic particles. See U.S. Pat. No. 4,113,843. A fourth method of preparing a zeolitic catalyst is to admix a zeolite with an inorganic matrix material and then to form particles of the admixture, by extrusion, marumerization, or otherwise. Another method of preparing a zeolitic catalyst comprises admixing of zeolite precursors, with or without matrix material, and then crystallizing the zeolite insitu.

Zeolitic catalysts prepared by conventional methods exhibit a water content in excess of about 1.5 wt.% prior to the effective use in hydrocarbon conversion processes of zeolitic catalysts prepared by conventional methods. It has been necessary heretofore to activate the zeolitic catalysts by calcination at temperatures in excess of about 1300° F., and usually in the range of from about 1300° F. to about 1600° F. It has now been found that partial dehydration of zeolitic catalysts with a water-immiscible organic solvent prior to calcining at a temperature below about 1200° F. produces a catalyst which is superior to catalysts produced by conventional methods.

The theory of the present invention is not completely understood. The activity of a zeolitic catalyst is a function of the accessibility to reactants of the zeolite constituent, in both chemical and physical terms. It is believed that during calcination of a zeolitic catalyst the catalyst progressively dehydrates and configurational rearrangement of the constituent atoms occurs which serves to minimize the electrostatic energy of the molecule. It is also believed that removal of hydroxyl groups during dehydration by calcination exposes tricoordinated aluminum and silicon sites. These sites display Lewis acidity. The acidity characteristics of a zeolite catalyst are extremely important in that acidity determines the degree of cracking activity and stability of the zeolite.

In the method of this invention, prior to calcination which reduces the water content of the catalyst below about 1.5 wt.%, the zeolitic catalyst prepared by conventional methods is contacted with a water-miscible organic fluid. The exposure of the catalyst to the organic fluid at least partially dehydrates the zeolitic catalyst such that the water content of the catalyst after contacting is less than about 1.5 wt.%. It appears that by so reducing the water content of the zeolitic catalyst acidity modification of the catalyst during subsequent calcination is enhanced. In addition, the required temperature of calcination after dehydration with an organic fluid to achieve a given level of catalytic activity is lower than the temperature required without dehydration with an organic fluid.

The mechanism whereby the method of this invention influences the activity of the zeolitic catalyst does not appear to be the same mechanism which prevails during calcination at the higher temperatures shown by the prior art. In other words, the zeolitic catalyst of this invention displays different activity and selectivity characteristics compared to a zeolitic catalyst which has not been dehydrated with an organic fluid pursuant to the method of this invention prior to calcination. Thus, it appears that the zeolitic catalyst of this invention is distinct, as evidenced by different properties, from a zeolitic catalyst prepared by conventional methods.

The first step in the method of this invention is the preparation of a zeolitic catalyst having a water content greater than about 1.5 wt.%. As previously stated, such as zeolitic catalyst can be prepared by any conventional or convenient method. The method selected normally will be a function of the intended use of the catalyst. Thus, zeolitic catalyst intended for service in a fluid catalytic cracking process is commonly produced by a spray drying technique. Likewise, zeolitic catalyst intended for use in a hydrocracking operation is commonly produced by an extrusion technique. This invention is not limited to any particular technique employed in preparing the precursor of the zeolitic catalyst of this invention, a zeolitic catalyst having a water content greater than about 1.5 wt.%.

The second step in the method of this invention is the contacting of the precursor zeolitic catalyst having a water content greater than about 1.5 wt.% with a water-miscible organic fluid to reduce the water content of the zeolitic catalyst to less than about 1.5 wt.%. The detailed procedure for accomplishing the dehydration of the second step will vary depending upon the particular precursor zeolitic catalyst and the particular organic fluid selected. In most instances, to reduce the water content of the precursor zeolitic catalyst to less than about 1.5 wt.% it will be necessary to select an organic fluid which forms an azeotrope with water, to admix the precursor zeolitic catalsyt with the selected organic fluid, and to evaporate a sufficient amount of the azeotrope to reduce the water content of the zeolitic catalyst to less than about 1.5 wt.%. In some instances the requisite reduction in water content of the precursor zeolitic catalyst may be accomplished without use of the azeotropic distillation. The latter instances will be rare, however, since the water required to be removed from the precursor zeolitic catalyst is probably chemically bound within the zeolitic structure, and moderate input of energy will be required to accomplish its release.

The water-miscible organic fluid must be sufficiently miscible with water to permit the reduction of the water content of the precursor zeolitic catalyst to less than about 1.5 wt.%. Factors besides solubility or miscibility which influence the choice of organic fluids include molecular weight, vapor pressure and polarity. It is desired that the zeolite catalyst of this invention contain little or no organic material. Therefore, it is desirable to select an organic fluid which will be completely or substantially removed during the calcination step in the method of this invention. Generally, low molecular weight, high vapor pressure organic fluids will be more completely removed by drying and calcination than higher molecular weight organic solvents with lower vapor pressures. Suitable organic fluids include aromatics, ethers, esters, ketones, aldehydes, alcohols, cyclic hydrocarbons, and mixtures thereof. Preferred organic solvents include aromatics, ethers, ketones and aldehydes having fewer than about 8 carbon atoms. Especially preferred are toluene, acetone, dimethyl ether, and diethyl ether.

The dehydration of the precursor zeolitic catalyst by contacting it with an organic fluid can be accomplished by any conventional or convenient method. The choice of a particular method of dehydration is within the skill of a technician reasonably skilled in solvent extraction techniques and requires no undue experimentation. The preferred method of reducing the water content of the zeolitic catalyst is azeotropic distillation. The distillation can be performed at an elevated temperature or at a reduced pressure. One convenient method of performing the distillation is to dispose the precursor zeolitic catalyst in a vessel, admix an amount of the selected organic fluid, preferably toluene, sufficient to completely immerse the catalyst, heat the admixture to at least the boiling point of the azeotrope, and remove the azeotropic vapors from the vessel. The required duration of the distillation and the amount of vapors removed will be a function of the water content of the precursor zeolitic catalyst, and can be determined by periodic sampling and analysis. The zeolitic catalyst is then removed from the vessel, dried, and calcined at a temperature of less than about 1200° F.

The third step in the method of this invention is calcining the zeolitic catalyst at a temperature of less than about 1200° F. Calcination can be performed in any conventional or otherwise convenient manner. Although temperatures in excess of 1200° F. can be used, the method of this invention does not require that a temperature of greater than about 1200° F. be used.

The volatiles content of catalysts is easily determined by a differential gravimetric method. A representative weighed sample of the catalyst is heated to a given temperature and periodically weighed until a constant weight is obtained. The loss in weight is calculated as a wt.% loss based on the weight of the sample prior to heating. All volatiles contents expressed in this specification are based on a test temperature of 900° C.

The following examples are presented to illustrate a method of manufacture of the catalytic composite of the present invention, as well as a use for the catalytic composite, and are not intended to limit the scope of the claims attached hereto.

EXAMPLE I

This example illustrates the method of preparation of a conventional zeolitic catalyst.

1. Acidified colloidal water glass is prepared by admixing water glass with concentrated sulfuric acid.
2. The acidified water glass is admixed with aluminum sulfate in amounts necessary to produce an admixture with a silica to alumina ratio of about 2.16.
3. The pH of the admixture is adjusted to about 5.0 by admixing aqueous ammonia solution with the admixture of step 2.
4. An amount of Na-Y zeolite is admixed with the admixture of Step 3 in an amount sufficient to yield a zeolitic catalyst comprising about 20 wt.% zeolite.
5. The pH of the admixture of Step 4 is adjusted to about 7.0 by admixing with it an aqueous ammonia solution, producing a slurry.
6. The slurry is spray dried to form a dried particulate catalytic composite.
7. The catalytic composite is washed with an aqueous solution of ammonium hydroxide and ammonium nitrate.
8. The washed catalytic composite is cation exchanged with rare earth cations.
9. The ion exchanged catalyst is dried at a temperature of from about 350° F. to about 500° F. for about two hours.
10. The dried catalyst is calcined at about 1600° F. for about one hour.

EXAMPLE II

This example illustrates one embodiment of the zeolitic catalyst of this invention. A dried catalyst is prepared in the manner described in steps number 1 through 9 of Example I. In place of calcining as in step number 10, the dried catalyst is admixed with a water-miscible organic fluid in a distillation apparatus. The organic fluid is one which forms an azeotropic mixture with water. The admixture is heated to the boiling point of the azeotrope, under atmospheric pressure. The catalyst portion of the admixture is periodically sampled, dried at about 400° F., and analyzed to determine its water content. When the water content of the catalyst is determined to be below about 1.5%, the catalyst is separated from the admixture, dried for about one hour at atmospheric pressure and from about 350° F. to about 500° F., and calcined for two hours at about 1100° F. The calcined catalyst of this example is one embodiment of the zeolitic catalyst of this invention.

EXAMPLE III

In this example, catalysts prepared as described in Examples I and II were compared.

A fresh fluid catalytic cracking process catalyst, designated CBZ-1 and commercially available from W. R. Grace & Co., was calcined at 1600° F. for one hour. The calcined catalyst, representing a catalyst manufactured by the method set forth in Example I, was thereafter steamed in a 100% steam environment at 1425° F. for 12 hours to simulate equilibrium catalyst conditions. The steamed catalyst is referred to below as CAT-A.

A second portion of fresh CBZ-1 catalyst was calcined in a manner to represent a catalyst prepared by the method of Example II, an embodiment of this invention. About 200 grams of fresh CBZ-1 catalyst were slurried with 1000 ml of toluene in a distillation apparatus. The resulting slurry was heated to about 231° F. for about one hour, the distillation vapors being continuously separated from the slurry. The catalyst was then separated from the slurry, and dried on a belt drier in an oven at atmospheric pressure and a temperature of about 350° F. for about one hour. The dried catalyst was then calcined at about 1100° F. for about two hours. The calcined catalyst was steamed in a 100% steam environment at 1425° F. for 12 hours to simulate equilibrium catalyst conditions. The steamed catalyst is referred to below as CAT-B.

Both CAT-A and CAT-B were evaluated in a microactivity testing pilot plant operated in a mode designed to simulate commercial fluid catalytic cracking processing. The feedstock used for each evaluation was about 1.28 grams of vacuum gas oil. About 4.0 grams of catalyst (volatiles—free basis) were used in each test. Reactor temperature was 900° F. in each evaluation. The results of the comparative evaluation are shown in the table below.

EXAMPLE IV

In this example, a third zeolitic catalyst was prepared and compared with the catalysts of Examples I and II. The catalyst of this example, hereinafter referred to as CAT-C, represents a catalyst prepared by the method used to prepare CAT-A, except that CAT-C was calcined at a lower temperature. Thus, a portion of fresh CBZ-1 catalyst was calcined at 1100° F. for two hours, and thereafter steamed in a 100% steam environment of 1425° F. for 12 hours to simulate equilibrium catalyst conditions. CAT-C was then evaluated in a microactivity testing pilot plant under the same conditions and in the same manner as CAT-A and CAT-B. The results of the evaluation are set forth in the Table below.

TABLE I

| | CAT-A (Conventional) | CAT-B (Invention Embodiment) | CAT-C (Control) |
|---|---|---|---|
| Volatiles, Wt. % | | | |
| Before Calcining | 14.3 | 14.3 | 14.3 |
| After Calcining | 1.6 | 0.7 | 3.4 |
| Organic Fluid Contacting | No | Yes | No |
| Calcining Temp., °F. | 1600 | 1100 | 1100 |
| Wt. % Conversion | 61.13 | 65.02 | 55.17 |
| Dry Gas Yield, $C_2$, SCF/bbl | 30.20 | 30.46 | 40.83 |
| Hydrogen Yield, SCF/bbl | 5.30 | 4.82 | 14.50 |
| Hydrogen/Methane, Mole Ratio | 0.44 | 0.37 | 1.18 |

The volatiles content of the catalysts was measured by a gravimetric method. A representative weight sample of catalyst was heated to 900° C. and periodically weighed until a constant weight is obtained. The loss in weight is calculated as a wt.% loss based on the weight of the sample prior to heating.

Comparison of the results of the above examples clearly shows the superiority of the catalyst and method of this invention. CAT-B, an embodiment of this invention, yielded a greater conversion of feedstock to products, yet the dry gas yield was no greater than the other catalysts.

Comparing CAT-A with CAT-B, it is seen that the method of this invention allows a lower, less energy-intensive and less physically destructive, calcination temperature while producing a zeolitic catalyst which is superior in conversion ability. A comparison of CAT-B with CAT-C shows that the superior performance of CAT-B is attributable not to a relatively low calcination temperature, but rather to the use of an organic fluid followed by low temperature calcination pursuant to this invention.

I claim:

1. A low temperature method of calcining a zeolitic catalyst having a water content greater than about 1.5 wt.%, which comprises reducing the water content of said catalyst to less than about 1.5 wt.% by contacting said catalyst with a water-miscible organic fluid, and thereafter calcining said catalyst at a temperature of less than about 1200° F.

2. The method of claim 1 wherein said organic fluid is an aromatic solvent having from six to about ten carbon atoms.

3. The method of claim 1 wherein said zeolitic catalyst has a zeolite content of at least about 10 wt.%.

4. The method of claim 1 wherein said zeolitic catalyst comprises a zeolitic crystalline aluminosilicate dispersed in a matrix comprising silica and alumina.

5. The method of claim 1 wherein said zeolitic catalyst comprises a zeolite selected from the group consisting of X-type zeolite and Y-type zeolite.

6. A zeolitic catalyst having a water content of less than about 1.5 wt.% prepared by contacting a zeolitic catalyst having a water content of greater than aboit 1.5 wt.% with a water-miscible organic fluid, and thereafter calcining said zeolitic catalyst at a temperature of less than about 1200° F.

7. The catalyst of Claim 6 wherein said organic fluid is an aromatic solvent having from six to about ten carbon atoms.

8. The catalyst of claim 6 wherein said zeolitic catalyst has a zeolite content of at least about 10 wt.%.

9. The catalyst of claim 6 wherein said zeolitic catalyst comprises a zeolitic crystalline aluminosilicate dispersed in a matrix comprising silica and alumina.

10. The catalyst of claim 6 wherein said zeolitic catalyst comprises a zeolite selected from the group consisting of X-type zeolite and Y-type zeolite.

* * * * *